United States Patent [19]
Reid

[11] Patent Number: 5,420,208
[45] Date of Patent: May 30, 1995

[54] CROSSLINKABLE POLYMERIC COMPOSITION

[75] Inventor: William B. Reid, Linlithgow, Scotland

[73] Assignee: Neste Oy, Porvoo, Finland

[21] Appl. No.: 252,549

[22] Filed: Jun. 1, 1994

Related U.S. Application Data

[63] Continuation of Ser. No. 156,390, Nov. 19, 1993, abandoned, which is a continuation of Ser. No. 832,231, Feb. 7, 1992, abandoned.

[30] Foreign Application Priority Data

Feb. 23, 1991 [GB] United Kingdom ............... 9103802

[51] Int. Cl.$^6$ .................... C08J 3/24; C08K 5/524
[52] U.S. Cl. .................... 525/326.5; 525/340; 525/342; 525/353; 524/147; 524/547
[58] Field of Search .......... 525/326.5, 340, 342, 525/353; 524/147, 547

[56] References Cited

U.S. PATENT DOCUMENTS

| | | | |
|---|---|---|---|
| 3,414,463 | 12/1968 | Jasinski | 528/23 X |
| 4,617,344 | 10/1986 | Tanaka et al. | 524/837 |
| 4,767,820 | 8/1988 | Keogh | 525/72 |

FOREIGN PATENT DOCUMENTS

| | | |
|---|---|---|
| 0149903 | 7/1985 | European Pat. Off. |
| 0150595 | 8/1985 | European Pat. Off. |
| 0169070 | 1/1986 | European Pat. Off. |
| 0245938 | 11/1987 | European Pat. Off. |
| 0340785 | 11/1989 | European Pat. Off. |
| 60-47076 | 3/1985 | Japan |
| 60-51753 | 3/1985 | Japan |
| 61-283657 | 12/1986 | Japan |
| 1329248 | 9/1973 | United Kingdom |
| 2192891 | 1/1988 | United Kingdom |

Primary Examiner—Mark Nagumo
Attorney, Agent, or Firm—Brooks Haidt Haffner & Delahunty

[57] ABSTRACT

Esters which are substantially non acidic esters of P or S oxyacids, especially phosphite ester antioxidants, are curing catalysts for the moisture curing of silyl polymers such as polyethylene carrying pendant trialkoxysilyl groups. The esters catalyse cross linking without causing significant precure.

16 Claims, No Drawings

CROSSLINKABLE POLYMERIC COMPOSITION

This application is a continuation of application Ser. No. 08/156,390, filed Nov. 19, 1993, abandoned, which is a continuation of application Ser. No. 07/832,231, filed Feb. 7, 1992, abandoned.

The present invention relates to crosslinkable organic polymer compositions. More particularly the present invention is concerned with crosslinkable compositions comprising organic polymers containing hydrolysable silane groups, which polymers can be thermoformed into shaped articles, for example cable insulation or pipe, and subsequently crosslinked by contacting the articles with water or steam in the presence of a so-called "silanol condensation catalyst".

It is known that organic polymers containing hydrolysable silane groups can be crosslinked by the action of water, preferably in the presence of a silanol condensation catalyst. A number of methods are known for producing such crosslinkable organic polymers. One method comprises copolymerising unsaturated organic monomers, for example, ethylenically unsaturated or vinyl monomers, with unsaturated silane compounds containing hydrolysable groups. Examples of this method are described in GB-A-2028831 and GB-A-2039513 which disclose the preparation of crosslinkable copolymers of ethylene and an ethylenically unsaturated silane compound by copolymerising the monomers at relatively high temperatures and pressures in the presence of a free radical polymerisation initiator. Another example of this copolymerisation method is described in GB-A-1415194 which discloses the preparation of crosslinkable copolymer by contacting ethylene and a terminally unsaturated silane compound, optionally with other olefinically unsaturated comonomer, with certain defined Ziegler catalysts under polymerisation conditions which preferably employ relatively low temperatures and pressures.

It is also known that polymers crosslinkable by the action of water and a silanol condensation catalyst can be prepared by grafting an unsaturated silane compound on to a preformed polymeric material. Grafting processes of this type can be carried out by heating together a base polymer, for example polyethylene, an unsaturated silane compound bearing one or more hydrolysable groups, a grafting initiator and optionally a silanol condensation catalyst, under conditions such that the unsaturated silane compound is grafted on to the base polymer. Examples of this method are disclosed in GB-A-1357549, GB-A-1234034, GB-A-1286460, U.S. Pat. Nos. 3,802,913, 4,117,063, 4,136,132 and 4,228,255. Examples of commercial processes which employ a grafting reaction of this type are the SIOPLAS and the MONOSIL processes. (SIOPLAS and MONOSIL are registered trade marks). In the SIOPLAS process, the base polymer is heated with the unsaturated silane in the presence of a grafting initiator and the product is extruded and pelleted to produce a pelleted silane-grafted thermoplastic polymer. The pelleted polymer can then be fed with a silanol condensation catalyst added as such or, preferably via a masterbatch blend of polyethylene and said catalyst to a thermoforming process for fabricating shaped products. These shaped products are then crosslinked by exposure to water or steam. In the MONOSIL process eg as described in U.S. Pat. Nos. 4117195 and 4351790, the base polymer, the unsaturated silane, the grafting initiator and the silanol condensation catalyst are fed simultaneously to a special extruder eg as described in GB 964428 in which grafting occurs "in situ" and crosslinkable products, e.g. cable or pipe, are directly extruded; EP 0163865A describes another 1 step process. These products can be crosslinked by exposure to steam or water under the influence of the silanol condensation catalyst.

Other known methods for forming polymeric materials having hydrolysable silane groups are the "transesterification" methods wherein a copolymer having exchangeable functions such as alkoxy groups (as, for example, in ethylene/ethyl acrylate copolymer) or carboxylate groups (as, for example, in ethylene/vinyl acetate copolymer) is treated with a suitable silane compound in the presence of a special ester-exchange catalyst.

For example, European patent application 4752 discloses a method for the production of water-curable silane-modified alkylene-alkyl acrylate copolymers which comprises reacting an alkylene-alkylacrylate copolymer, e.g. ethylene-ethyl acrylate, with a silane in the presence of an organotitanate catalyst, e.g. titanium tetraisopropylate. Examples of suitable silane compounds which can be used in this method are acetoxy propyl trimethoxy silane, acetoxy propyl triethoxy silane, methacryloxypropyl trimethoxy silane, acryloxypropyl trimethoxy silane, methacryloxypropyl triethoxysilane and acryloxypropyl triethoxy silane. In another example of the transesterification method ethylene/vinyl acetate copolymer can be reacted with a suitable silane compound bearing hydrolysable groups and having esterified carboxylic acid groups which exchange with the acetate groups on the copolymer. A suitable silane compound is 4-[tri(m)ethoxysilyl]butanoic acid (m)ethyl ester.

Polysiloxane-modified copolymers prepared by reacting a mixture containing an alkylene-alkyl acrylate copolymer and a polysiloxane in the presence of an organo titanate catalyst are also known. For example, European Patent No. 49155 discloses the production of such polysiloxane-modified copolymers and European patent application EP 120115 discloses compositions comprising a polysiloxane and an organo titanate and the use thereof in the production of such polysiloxane-modified alkylene-alkyl acrylate copolymers.

The present invention relates to crosslinkable organic polymers having pendant, hydrolysable silane groups. These polymers, are hereinafter referred to as "silyl polymers" may be prepared, as described above, by copolymerising unsaturated organic monomers with unsaturated silane compounds containing hydrolysable groups, by grafting an unsaturated silane compound on to a preformed polymeric material or by the transesterification methods using a monomeric silane, e.g. as disclosed in European patent application 4752. The silyl polymers can be fabricated to form a large variety of useful articles by conventional techniques, for example, extrusion, injection moulding, blow-moulding and film-blowing processes. The crosslinking step is generally carried out subsequent to fabrication of the article because the crosslinked polymer cannot in general be satisfactorily thermoformed, A problem encountered with silyl polymers is that during thermoforming operations the polymer can undergo premature crosslinking which can lead to difficulties in the fabrication of articles from the polymer or to the production of articles having unsatisfactory physical and mechanical properties. The problem is particularly serious in the production of extruded wire and cable insulation wherein it is important to provide an extruded layer of insulation which is substantially free from surface roughness. Wire or cable insulation which has a relatively rough surface can suffer mechanical damage (for example, tearing and snagging) leading to insulation failure. The roughness can also lead to electrical stress and insulation breakdown in higher voltage applications.

One method of reducing premature crosslinking in thermoforming proposed in GB-A-1357549 is to mould or extrude articles from silyl polymers in the absence of the silanol condensation catalyst and then to contact the produced article with an aqueous dispersion or solution of a tin carboxylate to cause the crosslinking. However, in many applications it is preferred to include the silanol condensation catalyst as a component of the polymer composition as this leads in general to higher crosslinking rates and to more complete crosslinking particularly in articles having thick cross section.

Many other attempts to overcome the problems of premature curing during thermoforming have been described. For example, in EP-A-149903, specific organic phosphorus or antimony compounds have been added to the silyl polymer to reduce premature cross linking during fabrication of articles therefrom; silanol curing catalysts especially an organotin carboxylate are also added to give a water curable composition. In EP-A-150 595 the silanol condensation catalyst is supported on a finely divided solid before blending with silyl polymer; certain phosphorus compounds may also be present in the curable compositions. The combination of silane polymer with dihydrocarbyl tin carboxylate from a dicarboxylic acid is described in EP-A-169070 to reduce premature cross linking during thermoforming; specific organic phosphorus compounds may also be present in the curable composition. But these attempts have been based on cross linkable compositions comprising organo metallic carboxylate especially diorgano tin carboxylates as the silanol curing catalyst.

It is an object of the present invention to provide an improved cure catalyst for cross linkable silyl polymers, as well as a cross linkable silyl polymer composition with acceptable cure rate in the presence of added water but with a reduced tendency to premature cross linking during fabrication of articles therefrom.

It has now been discovered that certain esters, especially phosphite ester antioxidants, can act as silanol condensation catalysts, as well preferably as thermally stabilizing the silyl polymer during processing and reducing premature cross linking.

The present invention provides an ester for use as a silanol condensation catalyst, said ester being a substantially non acidic ester of a phosphorus or sulphur oxy acid especially a lower valency P or S acid. The term "silanol condensation catalyst" is used in this specification as is conventional in the art to refer to a catalyst for the hydrolysis of Si—O alkoxy groups in the silane copolymer and not in respect of catalysts for the condensation between two Si—OH groups of silane copolymers. The ester is preferably an ester which is an antioxidant for polyethylene. The use of the said ester for catalysing the hydrolysis of Si—O-alkyl groups in silane containing polymers is also included.

The present invention provides a moisture curable composition comprising (i) a silyl copolymer and (ii) at least one of said esters, especially an antioxidant ester, preferably also with (iii) at least one phenolic or amine antioxidant. The curable composition with the above components is usually substantially free of other silanol condensation catalysts, such as inorganic tin or organotin carboxylates eg from mono or dicarboxylic acids, carboxylates of lead, cobalt, iron, nickel, zinc or tin, ethylamines, dibutylamine, hexyl amines, pyridine or strong inorganic or organic acids. The curable composition may consist essentially of (i) and (ii), but preferably consists essentially of (i), (ii), and (iii).

The present invention also provides a method of preparing a moisture cross linkable composition which comprises mixing (i) and (ii) and especially (iii), in the substantial absence of an added silanol condensation catalyst. Also is provided a masterbatch for adding to polymer (i), the masterbatch comprising an inert polymer and (ii) and especially (iii) in the substantial absence of added silanol condensation catalyst, and furthermore there is provided a method of forming a cross linked polymer which comprises contacting with water a cross linkable composition of the invention, especially one already thermoformed and in particular one comprising and (iii) especially in the substantial absence of other silanol condensation catalyst. There is also provided a method of curing a silyl polymer, which comprises blending a composition comprising silyl polymer (i) with a masterbatch comprising inert polymer and ester (ii), said composition and/or masterbatch containing an antioxidant (iii) but substantially free of added silanol condensation catalyst, and then contacting with water the blend obtained. The present invention also provides a combined antioxidant and cross linking catalyst for silyl polymers, which comprises and preferably consists essentially of the said lower valency P or S ester (ii) and said hindered phenol or amine (iii), and also provides the use of said components (ii) and (iii) as combined antioxidant and cross linking catalyst.

The silyl polymer employed in the composition of the present invention is, as mentioned above, an organic polymer containing pendant hydrolysable silane groups which is cross linkable by the action of water in the presence of a silanol condensation catalyst. The polymer usually has a carbon backbone and especially substantially only a carbon backbone. The backbone preferably comprises at least a majority of, and preferably substantially only, hydrocarbon groups. In particular the silyl polymer can substantially comprise polymerised olefin units. Preferably the silyl polymer is an ethylene polymer containing pendant, hydrolysable silane groups. Such ethylene polymers can comprise up to 40% e.g. up to 30% by weight of comonomer units other than ethylene and silane units. Preferably however, the ethylene polymer comprises less than 10% by weight of such other monomers. Suitable further comonomers include, for example vinyl esters, alkyl (meth) acrylates, unsaturated ethers, unsaturated carboxylic acids and derivatives of (meth) acrylic acid. Most preferably, the further comonomer, if present, is used in amount of from 1 to 20 per cent by weight of the total weight of the silane copolymer; however most preferably, the silyl polymer is a compolymer of ethylene units and silane units only. Preferred silyl polymers and references to their methods of manufacture are described above. Preferred silyl polymers are those prepared by copolymerising ethylene and an unsaturated silane compound having one or more hydrolysable groups preferably in the presence of a free radical initiator and optionally together with one or more other monomers copolymerisable therewith, or those prepared by graft copolymerising such an unsaturated silane on to a base polymer in the presence of a grafting initiator. Particularly preferred silyl polymers are those prepared by copolymerising ethylene and an unsaturated silane compound having one or more hydrolysable groups, optionally together with one or more other unsaturated compounds, at a temperature of 150° to 400° C. and a pressure of 1000 to 4000 bar (100 to 400 MPa) in the presence of a free radical polymerisation initiator.

The hydrolysable ethylenically unsaturated silane compound copolymerised with the alpha-olefin or polymer thereof is preferably a compound having the general formula (I); $R^1SiR^2{}_mY_{3-m}$ wherein $R^1$ represents an ethylenically unsaturated hydrocarbyl or hydrocarbyloxy hydrocarbyl group each usually of 2–10, especially 2–6, carbon atoms, or an ethylenically unsaturated carboxy hydrocarbyl group .e.g., with 3–18 carbons in the unsaturated carboxylic part and 1–10 e.g. 2–4 carbons in the hydrocarbyl part; $R^2$ represents an aliphatic saturated hydrocarbyl group (e.g. of 1–20 such as 1–6 carbon atoms or an aromatic hydrocarbyl group e.g. of 6–19 carbon atoms; Y represents a hydrolysable organic group e.g. of 1–15 carbon atoms and m is 0, 1 or 2. If the compound has more than one Y, the groups Y may be the same or different. Group Y may be an alkoxy group e.g. of 1–10 carbon atoms, acyloxy group e.g. of 1–10 carbon atoms or a mono or di alkylamino group having with 1–8 carbons in each alkyl group or a mono or diarylamino group with 6–13 carbons in each aryl group. Preferably $R^1$ is vinyl, allyl, isopropenyl, butenyl, cyclohexenyl or 3-acryloxy propyl or 3-methacryloxypropyl; preferably Y is methoxy, ethoxy, formyloxy, acetoxy, propionyloxy, alkylamino or arylamino; and preferably $R^2$ is methyl, ethyl, propyl, decyl or phenyl.

Particularly suitable unsaturated silane compounds are those having the general formula $CH_2=CHSi(OZ)_3$ wherein Z is a hydrocarbyl group having 1 to 8 carbon atoms, preferably 1 to 4 carbon atoms. Most preferably, the unsaturated silane is selected from the group consisting of vinyl trimethoxy silane, vinyl triethoxysilane and vinyl triacetoxy silane.

The silyl copolymer preferably contains from 0.01–10% such as 0.1 to 10% by weight, more preferably 0.5 to 5% or 0.7–2% by weight of copolymerised units or grafted units of the silane compound (based on the weight of silane copolymer). The Melt Index (MI) of the silane copolymer is usually 0.02 –50g/10 mins, e.g. 0.1–15 (measured according to ASTM D-1238 condition E, 190° C. with 2.16 kg load as are all MI figures given in this specification). (Unless otherwise stated).

The curable composition also contains an ester (ii). The ester is substantially free of P—OH or S—OH bonds and is substantially non acidic e.g. with a pH of 10% aqueous medium of greater than 3.5 especially greater than 5.5 e.g. 3.5-8 or 5.5-7. The ester is especially substantially neutral and is a fully esterified derivative of the P or S oxy acid. The ester is usually a lower valency phosphorus ester such as a phosphite or phosphonite ester or a lower valency sulphur ester, such as a sulphite ester. Examples of suitable phosphites are those of formula (II) $[R^5O—P(OR^6)O]_nR^7$ where n is an integer of 1 to 4 especially 1 or 2 each of $R^5$ and $R^6$, which may be the same or different, represents an alkyl group e.g. of 1–24 but preferably 8–22 and especially 12–20 carbons such as decyl, dodecyl, tridecyl, tetradecyl, cetyl or stearyl, or alkoxy alkylene group with 1-20 carbons e.g. 6-20 carbons in the alkoxy group and 1-10 e.g. 1-4 carbons in the alkylene groups e.g. 2-hexyloxy ethyl group, or a cycloalkyl group e.g. of 5-9 carbon atoms such as cyclohexyl, or an aryl group e.g. of 6-20 carbons e.g. an aromatic hydrocarbyl group especially phenyl, optionally substituted with 1, 2 or 3 alkyl e.g. 1-6 carbon atom groups such as methyl, ethyl or tert butyl, as in di-tert butylphenyl or nonylphenyl and $R^7$ may be the same or different from $R^5$ or $R^6$ or $R^7$ represents an n valent organic group, e.g. an alkylene, alkylene oxyalkylene, alkylene poly (oxyalkylene) group or a cycloalkylene or arylene group, or generally ones formed by removal of n-1 hydrogen atoms from the group from the list for $R^5$ or $R^6$. While trialkyl phosphites especially those with 10-22 carbon atoms in each alkyl are useful, preferably at least one and preferably 2 or 3 groups for $R^5$, $R^6$ and $R^7$ represent aryl groups. Alternatively $R^6$ and $R^7$ together represent a divalent residue $R^8$ formed by removal of 2 hydroxyl groups from a 1,2 or 1,3 diol such as an alkylene diol of 2–4 carbon atoms to give a compound of formula III $R^5OP(O_2R^8)$. Advantageously n is 2 and the phosphite is a di or poly phosphite wherein $R^5$ and $R^6$ are as defined and $R^7$ represents a divalent residue $R^9$ formed by removal of hydroxyl groups from a diol e.g. of 2–20 carbons, such as a linear aliphatic diol, or ether diol e.g. mono or dipropylene glycol or 1,6-hexylene glycol, or a dihydroxylic phenol e.g. of 6–20 carbons, especially a phenol with 2 phenylene groups such as bisphenol A. $R^7$ may also represent a divalent group of formula IV

where p is 1–15 e.g. 2–10, and $R^{10}$ is as defined for $R^9$. $R^7$ as such or together with $R^6$ may also represent a trivalent residue $R^{11}$ or tetra valent residue $R^{12}$ formed by removal of 3 or 4 hydroxyl groups respectively from a tri or tetra hydroxyl compound e.g. an aliphatic one of 3–8 or 4–8 carbon atoms such as pentaerythritol; preferably the phosphite is of formula V $R^5 O P(O_2R^{12}O_2)$-$POR^5$. Instead of the phosphite a phosphonite of formula VI $[R^5O(R^6O)P]_bR^4$ may be used wherein b is 1 or 2, $R^5$ and $R^6$ are as defined above and $R^4$ is an aliphatic group e.g. of 1–10 carbon atoms or aromatic group e.g. aromatic hydrocarbyl group of 6–19 atoms especially a phenyl or mono or dialkyl phenyl group in particular mono- or di-tertiary butyl phenyl, especially in the ortho and/or para positions, or $R^4$ forms a divalent aliphatic group $R^{13}$ e.g. of 1–10 carbon atoms or a divalent aromatic group such as an aromatic hydrocarbyl group with 6–20 carbons such as phenylene e.g. 1,4-phenylene or biphenylene e.g. pp-biphenylene. Preferably the phosphonite is of formula VII $R^5O(R^6O)PR^{13}$-$P(OR^6)OR^5$. Advantageously the phosphite ester has at least two phosphite ester groups per molecule e.g. 2–12 groups such as 2 or at least 3 e.g. 3–10, and advantageously has features as designated VIII-XII below; preferably the phosphite ester has at least one e.g. 1–10 structural units derived from a polyol of 2–4 hydroxyl groups, e.g. as defined for $R^8(OH)_2$, $R^9(OH)_2$, $R^{10}(OH)_2$, $R^{11}(OH)_3$ or $R^{12}(OH)_4$; the phosphite ester may have 1 or 2–9 polyol structural units. Advantageously the phosphite VIII contains phosphorus atoms attached to at least 2 different kinds of groups selected from O-aliphatic (including Cycloaliphatic) groups, O-aromatic group and groups forming a ring with the phosphorus atom. Examples of the aliphatic cycloaliphatic and aromatic groups are those defined for $R^5$ above. The O-aliphatic or O-aromatic groups may be from mono hydroxy compounds or diol, triol or tetraols, but preferably the O aliphatic groups are from a diol with the O aromatic groups from a mono hydroxy phenol, or the O-aliphatic groups are from a mono ol while the aromatic O groups are from a dihydroxylic phenol. Preferably each phosphorus atom is bonded in phosphite IX to O-aliphatic and O-aromatic groups only, and is bonded to both groups especially so that the phosphite has on average more phosphorus-O-aliphatic bonds than phosphorus-O-aromatic bonds (phosphite X) or more phosphorus-O-aromatic bonds than phosphorus-O-aliphatic bonds (phosphite XI). The phosphite may also have each phosphorus atom bonded to the ring forming group, and an O-aliphatic (including cycloaliphatic) or O-aromatic group (phosphite XII); the ring forming group is usually a $OR^{14}O$ group where $R^{14}$ is a divalent group, which with the 2 oxygen atoms forms a ring especially one of 5–7 ring atoms with the P atom, especially a 1,3-dioxa-2-phosphacyclohexane ring or 1,3-dioxa-2-phospha cyclopentane ring. The divalent group for $R^{14}$ usually has 3–8 carbon atoms, in preferably an aliphatic hydrocarbyl group such as 1,3 propylene as in a cyclic phosphite from propylene glycol, or an aromatic hydrocarbyl group e.g. of 6–10 carbon atoms such as in a catechol cyclic phosphite ester. Advantageously the phosphite XII can contain at least 2 phosphorus atoms each bonded to the same group thereby forming 2 phosphorus oxygen containing rings such that e.g. two groups $O—R^{14}—O$ are joined to form an $(—O)_2R^{16}(O—)_2$ group, wherein $R^{16}$ is a tetravalent group forming 2 rings, each as otherwise defined for $R^{14}$, but with a total of 4–16 carbon atoms such as a tetra methylene methane group. Examples of suitable commercially available phosphorus compounds are the tris (2,4-di tert butyl)phenyl phosphite (e.g. sold as IRGAFOS 168), tris (nonylphenyl)phosphite, tri phenyl phosphite, (sold as DOVERPHOS 10), tris tridecylphosphite, (sold as DOVERPHOS 49), tetrakis (2,4-di.-tert.butyl phenyl)-4 4¹-biphenylenedi phosphonite, (sold as IRGAFOS P-EPQ or SANDOSTAB P-EPQ), bis(-di-2,4-(tert butyl)phenyl diphosphite esters from pentaerythritol (sold as ULTRANOX 626), the distearyl diphosphite esters from pentaerythritol (sold as WESTON 618 or DOVERPHOS S680) the latter optionally with less than 2%, e.g. 0.5-2% such as less than 1% of an aliphatic amine e.g. an alkanolamine of 6–20 carbon atoms such as tris(isopropanol)amine) (sold as WESTON 619 or DOVERPHOS S682), tetra phenyl di propylene glycol diphosphite (sold as DOVERPHOS II), tetra kis(stearyl) ester of 2,2-bis (4-hydroxyphenyl)-propane diphosphite (sold as DOVERPHOS 454) and the poly phosphite esters such as polydipropylene glycol phenyl polyphosphite with 4–10P atoms (sold as DOVERPHOS 12), and poly (2,2-bis(4 hydroxylphenyl)propane) alkyl polyphosphites, with 4–10 P atoms, wherein the alkyl group has an average of 15–16 carbon atoms (e.g. as sold as DOVERPHOS 613). An Alkanolamine e.g. of 2–20 or 6–20 carbons especially a tertiary alkanolamine such as triethanol-amine or triisopropanolamine may also be present in an amount of less than 2% such as 0.1-2% or 0.5-1% by weight of the ester (ii) especially phosphite.

Instead of, or as well as the lower valency phosphorus ester, there may be used at least one ester of a lower valency sulphur oxy acid, e.g. with the valency of not more than 4, such as sulphurous or hyposulphurous acid. Sulphite esters are preferred, especially ones of formula $(R^5O)(R^6O)SO$ wherein $R^5$ and $R^6$ are as defined above, such as di[2,6-ditert.butyl phenyl]sulphite, di[2,4-ditert.butyl phenyl]sulphite and di[tridecyl]sulphite.

The compositions of the invention based on the lower valency phosphorus or sulphur ester may cure in the presence of moisture in comparable time to corresponding oxidatively stabilised compositions containing metal carboxylates such as dibutyltin dilaurate or maleate but are also effective as antioxidants for stabilizing the silyl polymer during processing.

The lower valency P or S esters above are preferably secondary free radical collector antioxidants, and if such esters are present in the curable composition then usually no further secondary anti-oxidant is added.

The compositions of the invention preferably also contain (iii) a phenolic or amine antioxidant, in particular for stabilizing the shaped cured silane polymer during use, e.g. in a buried cable.

The phenolic or amine antioxidant is preferably an aromatic compound, which is an amine or hindered phenol. The sterically hindered phenol usually has at least one alkyl group e.g. of 1–6 carbons and especially 2 alkyl groups in an ortho position to the phenolic hydroxyl group. Secondary or especially tertiary alkyl groups are preferred such as isopropyl, isobutyl and isoamyl, but especially tert butyl. The aromatic compound may just have the hydroxy group substituent, and alkyl substituents, but preferably contains at least one other substituent especially containing an ester group such as one with a long fatty alkyl chain e.g. of 8–20 carbons. Other hindered phenols have 2 or more phenolic rings either bonded together directly or via an oxygen —NH— or —S— or alklene or alkylidene bridge e.g. of 1–6 carbon atoms. Other polyphenolic compounds are formaldehyde condensaters of p- alkyl phenols and [bis(hindered phenolic ring) substituted] alkanoic esters of alcohols e.g. of 1–20 carbons such as stearyl alcohol or ethylene glycol. If desired the hindered phenol may contain enolizable groups such as —CONH— groups, as in hindered phenol oxamides such as sold by Ciba Geigy as IRGANOX MDI024.

Examples of hindered phenols are 2,6 di-tertbutyl phenol, thio bisphenols such as bis(2 hydroxy 3 tert butyl 5 methylphenyl) sulphide and bis(2 methyl 4 hydroxy 5 tert butylphenyl)sulphide, alkylidene bis phenols such as methylene and ethylidene bis(methyl tert butyl 2 or 4 phenols), hydroxybenzyl compounds such as 4-hydroxy 3,5-ditert butyl benzyl compounds such as tris 2,4,6-(4-hydroxy-3,5-di tert butylbenzyl)durene or tris[4-hydroxy 3,5-di tert.butyl benzyl]isocyanurate and amino phenols such as fatty acyl amino phenols and hydroxyphenyl propionates especially 3-[3,5-di-tert butyl 4-hydroxyphenyl]-propionates ester such as the mono ester of octadecanol (e.g. as sold as IRGANOX 1076) or the tetra ester of pentaerythritol (e.g. as sold as IRGANOX 1010)] or the bis[bis 3-(3,5 di-tert butyl 4 hydroxyphenyl)propionic acid ester of ethylene glycol.

The amine antioxidant is preferably aromatic and may be hindered with an alkyl group ortho to the amine group, but is preferably a secondary aromatic amine especially a bis(aromatic) amine wherein the aromatic groups are the same or different. Examples of hindered amines are secondary aromatic amines e.g. of 6–50 or 14–35 carbon atoms such as bis(4-alkyl phenyl)amines or bis[4-(2'-phenylpropylidene)phenyl]amine. Other amine antioxidants are hindered N-heterocyclic compounds with at least one alkyl group e.g. of 1-6 carbon atoms and especially 2 alkyl groups in a ring carbon atom adjacent to N-heterocyclic atom. Secondary or tertiary alkyl groups are preferred such as isopropyl, isobutyl and isoamyl, but especially tertbutyl. Examples of the heterocyclic compounds are substituted piperidines, especially 2,6-dialkyl piperidines and their N-alkyl substituted derivatives.

While lower valency P and S esters are preferred for ester (ii), triorganophosphate esters and diorganosulphate esters may be used, especially when they can fulfil another functional role in the cured composition. Thus examples of suitable phosphate esters are ones of formula $R^5O-PO(OR^6)OR^7$, wherein $R^5$, $R^6$ and $R^7$ are as defined above, especially triarylphosphates such as triphenyl, tritolyl and trixylylphosphate; these phosphate esters provide a combined fire retardant and silanol cure catalyst additive. Examples of suitable sulphates are those of formula $R^5R^6SO_4$.

The curable compositions usually contain 0.01-10% e.g. 0.01-5% or 0.1-5% and especially 0.1-0.5%, or 0.5-5% or 0.3-3% of the ester (ii) and 0-10% preferably 0.01-10% or 0.01-5% and especially 0.01-0.5% or 0.5-5% of the amine or hindered phenol (iii), based on the weight of the silyl polymer. The molar ratio of ester (ii) to phenol or amine (iii) is usually 1-10:10-1 such as 1-4:9-6. The amount of lower valency P ester e.g. phosphite (ii) is usually 0.01-1 especially 0.06-0.5 moles per mole of silyl group in silyl polymer (i), or 0.001-0.5 e.g. 0.01-0.5 especially 0.03-0.25 P atoms per mole of silyl group.

The curable compositions usually contain at least an antioxidatively effective amount of the phosphite or sulphite ester.

The curable compositions may be made by mixing the ingredients directly such as by blending in conventional blending or compounding equipment such as an extruder or mill; compositions with phosphite esters with both aliphatic and ring groups bonded to the P or P—O groups, especially those of formula X, are particularly valuably made by this route, as they do not tend to show premature gellation in the extruder. Preferably however, the ester, and phenol or amine, if present, are preblended in a masterbatch concentrate with a suitable inert thermoplastic polymer compatible with the silyl polymer, such as a polyethylene e.g. low density or linear low density polyethylene or ethylene vinylacetate or ethylene ethyl acrylate copolymer. This approach is particularly valuable with phosphite esters with only aliphatic or only ring groups bonded to P or P—O group. The masterbatch may contain 0.1-40% e.g. 0.5-30%, 0.5-20%, 0.5-10% or 5-35% or 15-20%; of the ester and 0-40% preferably 0.1-40% or 0.5-20% and especially 0.5-10%, 5-20% or 2-8% of the hindered phenol or amine based on the weight of the inert polymer. The masterbatch is otherwise substantially free of added silanol condensation catalysts, as defined above, especially inorganic or organic tin carboxylates. However, the masterbatch may contain other additives providing other properties to the masterbatch and thus the curable composition; examples of such additives are fillers such as chalk, talc, mica and silica, flame retardant material such as metal hydroxides e.g. aluminium hydroxide or magnesium hydroxide or conducting compounds such as carbon black, metal deactivators (e.g. salicylaldehyde oximes) lubricants, water tree inhibitors, foaming agents and pigments. If desired these other additives may be mixed directly with the silyl polymer rather than via a masterbatch. Preferably the masterbatch is prepared by blending the above ingredients with the inert polymer and then the masterbatch is blended with silyl polymer usually with amounts of 50-99 parts e.g. 75-97, 80-95 or 87-97 parts of the latter blended with 1-50 parts of the former, e.g. 3-25, 5-20 or 3-13 parts. The final curable compositions may contain 60-100% e.g. 75-97, 80-95% or 87-97% of the silyl copolymer and 0-40% e.g. 3-25%, 5-20% or 3-13% of this inert polymer from the masterbatch. If desired the composition of the invention may be blended with compatible polymeric materials e.g. polyethylene, polypropylene, ethylene ethyl acrylate copolymer or ethylene alpha olefin copolymers e.g. LLDPE. The compositions of the invention including the masterbatch concentrate may be made by blending the polymer (i) with the other ingredients in an extruder, blender or mill and/or other ingredients which are liquid may be absorbed into the polymer granules, with elevated temperatures and/or use of intensive mixing to increase the rate of absorption of the liquids.

Instead of mixing preformed graft silyl polymer with the ester and other ingredients if desired, it is also possible to prepare the cross linkable composition of the invention by grafting with silane in situ in the presence of the ester a base polymer, for example low density polyethylene, linear low density polyethylene, ethylene/ethyl acrylate copolymer or ethylene/vinyl acetate copolymer. The ester can, for example, be added to the base polymer prior to or during the performance of the grafting reaction.

It has also been found certain phosphites, in particular those of formula X, produce with the silyl polymer, curable compositions, which on exposure to moisture, have a significant delay before the start of curing. The delay or induction period may be at least 25 days at room temperature under ambient moisture conditions or at least 5 hours on immersion of the composition in water at 90° C. With such compositions it is therefore possible to blend all the ingredients for the curable composition together to form a one pack curable storable composition, rather than involving a 2 pack system with the cure catalyst and silyl polymer kept separate for mixing just before the composition is required for use. Such a one pack composition is in marked contrast to and a significant improvement over conventional silyl compositions containing organotin cure catalysts where 2 pack systems are essential. Thus the present invention also provides a moisture curable composition comprising (i) a silyl copolymer and (ii) at least one phosphite ester antioxidant with at least two phosphite ester groups per molecule, at least one of said phosphite groups having a —P—O— aromatic and at least one of said phosphite groups having a —P—O— aliphatic bond (or cycloaliphatic) bond, the phosphite ester as a whole having on average more P—O— aliphatic (or cycloaliphatic) bonds than P—O— aromatic bonds. Examples of structures for said phosphite esters are those of formula $R^{18}$—OP(OR$^{19}$)—O—R$^{17}$—O-P(OR$^{18}$) OR$^{19}$ where each of $R^{18}$, $R^{19}$, $R^{20}$ and $R^{21}$ which may be the same or different as defined for the alkyl or cyclo alkyl groups of $R^5$, while $R^{17}$ is a (i) divalent residue formed by removal of hydroxyl groups from an aromatic diol e.g a dihydroxylic phenol such as one of 6-20 carbons especially a phenol with 2 aromatic rings, each containing a hydroxyl group, the aromatic rings being bonded directly together or via bridging alkylene group e.g. of 1-6 carbons, such as methylene, ethylene, ethylidene or isopropylidene, or (ii) a divalent group of formula —$R^{17}$—O—[P($OR^{18}$)—$OR^{17}$—]$_p$ wherein p is as defined above. Examples of such phosphite esters are tetra bis alkyl esters of bis phenol A diphosphite e.g. the stearyl esters (sold as DOVERPHOS 454) and polyalkyl poly bis phenol A polyphosphites e.g. with 4-10 P atoms in total, e.g. where the alkyl group has an average of 15-16 carbon atoms (sold as DOVERPHOS 613).

A moisture crosslinkable composition according to the present invention comprising the silyl polymer, the ester and, optionally other ingredients, can for example be prepared directly in the form of crosslinkable finished articles by extruding a base polymer, e.g. polyethylene, together with the ester, an unsaturated silane compound of the type described earlier in this specification, a free radical catalyst, i.e. initiator for grafting (e.g. an organic peroxide). This method can be applied for example in the well-known MONOSIL (RTM) process for the production of insulated wire and cable.

The composition of the present invention can be used to manufacture crosslinked products using the technology known in the manufacture of articles from conventional silyl polymers. For example, the composition can be used in blow-moulding, injection-moulding, film-blowing, calendering, extrusion, roto-moulding and extrusion-coating techniques. The composition is particularly preferred for wire and cable coating applications. Wire and cable insulations produced by extrusion coating using the composition of the present invention exhibit improved surface finish.

The compositions of the invention which comprise the silyl polymer and the ester should preferably be prepared and maintained in a moisture free atmosphere until ready for use, which ideally is shortly after preparation to minimize cross linking on long term storage.

The compositions of the present invention can be crosslinked by exposure to water e.g. at 10°-150° C. and especially at 50°-100° C. Cure times can be 0.1-500 hr, preferably 0.5-30 hr depending on the concentration of ester (ii) and the temperature. The crosslinking can be effected by simply storing under ambient conditions of temperature and humidity, storing in a humid atmosphere or by treating with water or steam or moisture. For example, the compositions can be crosslinked, normally after forming into shaped products, by being passed through a water bath, sprayed with water or stored, in a steam-filled cabinet. If desired the water bath may contain some ester antioxidant.

The water needed for hydrolysis and condensation of the silane groups can be included in the polymer composition. For example, water can be mixed into the polymer composition with another substance which is miscible with the polymer, e.g. propylene glycol, or the water can be physically or chemically bound to a substance which is miscible with the polymer e.g. in the form of water of crystallisation.

The present invention includes a method for forming a shaped, crosslinked product from the stabilised, crosslinkable composition of the present invention which method comprises thermoforming the product and then crosslinking by exposure to water. Preferably the thermoforming is extrusion coating of an electrical conductor. For example, reels or drums of wire or cable which have been extrusion-coated with a silyl polymer containing ester condensation catalyst are preferably exposed to moisture at elevated temperature to effect crosslinking of the silyl polymer. The exposure can take the form of immersion in a tank of hot water at about 80° C. or exposure to low pressure steam at about 100° C. in an enclosure commonly termed a "sauna". The length of time required to crosslink the silyl polymer to the extent that it will comply with the requirements of the appropriate specification depends on the time needed to raise the temperature of the wire or cable and the thickness of the silyl polymer coating. Typically, a reel containing 2 km of 25 $mm^2$ cable insulated with a 1.5 mm thick layer of silyl polymer will have to be treated for about 6-30 hours to achieve the desired degree of crosslinking using these techniques.

Silyl polymers containing the ester silanol condensation catalyst will also gradually crosslink under ambient storage conditions due to the effect of atmospheric moisture permeating the silyl polymer.

The inclusion in the crosslinkable composition of certain particular esters increases the tendency of the composition to crosslink under ambient conditions of temperature pressure and humidity, so these compositions according to the present invention can be crosslinked relatively rapidly under ambient conditions of temperature, pressure and humidity within 48 hours of extrusion. The need to expose the silyl polymer to water or steam at elevated temperature can therefore be eliminated or at least reduced.

The esters in the curable composition of the invention catalyse the cure of the silyl polymers but can have the additional benefits over known organotin carboxylates of reduced toxicity and secondary additive properties such as antioxidant or flame retardant properties thereby reducing the number of ingredients in the cured polymer reducing costs and possible problems of incompatibility in multi component systems.

The invention is illustrated in the following Examples.

EXAMPLES 1-13

Ethylene was copolymerised with vinyl trimethoxy silane to give a low density polyethylene with 1.14 wt% vinyl trimethoxy silane units (hereafter called silyl polymer) of Melt Index (0.4 g/10 mins). The silyl polymer was compounded in a Brabender Plasticorder with each phosphorus compound as specified below in an amount of 0.2% or 2% wt at 150° C. under nitrogen for 5 minutes to give a polymer composition.

Each polymer composition obtained was cut into small chips (about 2×2×2 mm) and analysed for gel content initially and then after immersion in water at 90° C. for various times. The gel content, which is a function of the amount of crosslinking, was determined by a method based on ASTM D 2765 from the percentage not dissolved in boiling xylene at 140°C after 24 hours: in each case 20-30 chips were placed in pouches in the xylene gel. Several chips in each pouch were tested each time for gel content. The phosphites (A-H) or phosphonite (J), which were all commercially available polyethylene antioxidants, and details of whose structures were given above, were as follows (A) WESTON 626 (B) DOVERPHOS 49 (C) DOVERPHOS S680 (D) DOVERPHOS S682 (E) DOVERPHOS 11 (F) DOVERPHOS 12 (G) DOVERPHOS 613 (H) DOVERPHOS 454 and J (IRGAFOS P-EPQ). The DOVERPHOS products were obtained from Dover Chemical Corporation, Dover Ohio U.S.A. and ULTRANOX 626 from Borg Warner and IRGAFOS P-EPQ from Ciba Geigy. They are used as commercially obtained without further treatment. The results were as follows.

TABLE 1

| Example | 2% Phosphite or Phosphonite | % GEL AFTER TIME | | | |
|---|---|---|---|---|---|
| | | 0 hrs | 1 Day | 2 Days | 5 Days |
| 1 | A | 3.4 | 52.1 | 70.3 | 74.0 |
| 2 | B | 0.5 | 71.4 | 79.9 | 80.3 |
| 3 | c | 0.7 | 71.2 | 75.0 | 75.0 |
| 4 | D | 0.5 | 73.2 | 74.3 | 75.6 |
| 5 | E | 6.4 | 75.7 | 77.0 | 78.1 |
| 6 | F | 0.4 | 73.0 | 75.3 | 78.0 |
| 7 | G | 0.4 | 47.9 | 70.9 | 78.1 |
| 8 | H | 0.5 | 76.2 | 78.3 | 80.0 |
| 9 | J | 4.3 | 10.8 | 23.9 | 47.5 |

TABLE 2

| Example | 2% Phosphite | % GEL AFTER TIME (hr) | | | | |
|---|---|---|---|---|---|---|
| | | 0 | 0.5 | 1 | 2 | 5 |
| 3 | C | 0.43 | 57.9 | 64.0 | 67.2 | 73.3 |
| 4 | D | 0.1 | 55.9 | 65.7 | 69 | 74 |
| 6 | F | 0.24 | 59.2 | 63.8 | 70.1 | 72.6 |
| 8 | H | 0.23 | 0.33 | 0.43 | 0.76 | 72.4 |

TABLE 3

| Example | 0.2% Phosphite | % GEL AFTER TIME (hr) | | | |
|---|---|---|---|---|---|
| | | 0 | 1 | 5 | 24 |
| 10 | C | 0.51 | 19.9 | 33.3 | 55.7 |
| 11 | D | 0.45 | 27.4 | 38.7 | 52.7 |
| 12 | F | 0.53 | 47.7 | 51.2 | 58.7 |
| 13 | H | 0.3 | 0.45 | 0.68 | 54.8 |

The induction period with compound H before any gelation started is noteworthy.

EXAMPLE 14–17

The process of Ex 3, 4, 6 and 8 was repeated with immersion of the composition in water all 25° C. instead of 90° C. and the gel times redetermined. The results were as follows.

TABLE 4

| Example | 2% Phosphite | % GEL AFTER TIME (Days) | | | | |
|---|---|---|---|---|---|---|
| | | 0 | 1 | 2 | 5 | 12 |
| 14 | C | 0.43 | 55.2 | 69.5 | 73.25 | 75.0 |
| 15 | D | 0.1 | 44.9 | 70.4 | 71.9 | 75.0 |
| 16 | F | 0.24 | 50.8 | 69.7 | 70.8 | 75.0 |
| 17 | H | 0.23 | 0.2 | 0.41 | 0.65 | 12.8 |

The composition of Ex 8 with phosphite H was kept in the laboratory open to the air under ambient temperature and moisture conditions for 26 days with negligible gellation (0.48% compared to 0.24% gellation at the start).

EXAMPLE 18, 19, 21, 22, 25 AND COMP EX 20, 23 AND 24

The process of Ex 1 was repeated with the same silane copolymerised polyethylene and either (i) the phosphonite (J) (sold as IRGAFOS P-EPQ by Ciba Geigy) alone or with a hindered phenol, namely octadecyl 3-[3,5-ditert. butyl 4-hydroxy phenyl]propionate (sold as IRGANOX 1076 by Ciba Geigy), or (ii) tris(2,4-ditert.butyl phenyl)phosphite (sold as IRGAFOS 168 by Ciba Geigy) or (iii) said hindered phenol alone or (iv) none of these 3 additives.

For Examples 18 and 19 and Comp Ex 20 the polymer composition was compounded at 150° C. under nitrogen, while for Examples 21, 22 and 25 and Comp Ex 23 and 24, the compounding was at 150° C. in air. Each compounded composition was formed into a thin film by heating at 180° C. for 2 min and then pressing for 3 min at 180° C. under a load of 10 tons. Each film was analysed before and after immersion in water at 90° C. for 12 days by Fourier Transform Infrared analysis for the Si—O—Si peak at 1025 cm$^{-1}$ characteristic of cured polymer.

The results were as follows.

| Ex Comp Ex 20 | Weight & additive | | Relative Peak Height |
|---|---|---|---|
| | P Compound | Phenol (0.2%) | |
| 18 | PEPQ (0.1%) | 1076 | 2.2 |
| 19 | PEPQ (2%) | — | 4.9 |
| Comp Ex 20 | — | — | 1.3 |
| 21 | PEPQ (0.1%) | 1076 | 2.05 |
| 22 | PEPQ (0.2%) | — | 2.2 |
| Comp Ex 23 | — | 1076 | 1.7 |
| Comp Ex 24 | — | — | 1.3 |
| 25 | 168 (0.2%) | — | 2.0 |

EXAMPLE 26–28 AND COMP EX 29

Ethylene was copolymerised with vinyl trimethoxy silane to give a low density polyethylene with 1.40 wt % vinyl trimethoxy silane units (hereafter called silyl polymer) of Melt Index 1.5 g/10 mins. The silyl polymer was stabilised by addition of 500 ppm of IRGANOX 1330 antioxidant, which is 1,3,5-trimethyl-2,4-6-tris (3,5-ditert. butyl-4-hydroxybenzyl) benzene and sold by Ciba Giegy.

A master batch was made containing low density polyethylene (LDPE) sold by BP Chemicals under the trade mark LD 1302 AA of Melt Index 0.2g/10 mins (according to Test Method 1SO1133). 89.5 parts by weight of LDPE was mixed with 2.5 parts by weight of IRGANOX MD 1024 metal complexant which is N,N$^1$-bis[3-(3,5 di tert.butyl-4-hydroxy phenyl)]propion hydrazide (sold by Ciba Geigy) and 3 parts by weight IRGANOX 1010 phenolic antioxidant, which is the tetra ester of 3(3,5 ditert butyl hydroxy phenyl)propionic acid with pentaerythritol sold by Ciba Geigy, and also 5 parts by weight of DOVERPHOS S680 phosphite, as used in Ex 4 above; the mixing was done in a Banbury mixer at 110°–115 ° C. for 11 minutes at 150–200 rpm maximum mixing speed.

Various amounts of of the masterbatch were blended with various amounts of the silyl polymer to give moisture curable compositions which were compared with a moisture curable composition (Comp Ex 29) of 95 parts of said silyl polymer with 5 parts of masterbatch containing 0.7% of di butyltin maleate (DBTM) curing catalyst and 93.8% of the LDPE, with the same amounts of IRGANOX MD 1024 and 1010 as before. The blends of masterbatch and silyl polymer were made by compounding in an extruder at a temperature of 140° rising to 193° C. and a screw speed of 45–48 rpm to extrusion coat a wire of 1.4 mm diameter at 44 m/min to give a coated cable of diameter 3.07–3.12 mm. The texture and quality of the surfaces of the cured wires of all 4 blends were equal. The cured wires were tested for heat elongation, tensile strength, Elongation and resistance to ageing after 7 days at 135° C. (as shown by retention of tensile strength and elongation) according to test methods 1EC811-2-1, 1EC811-1-1, IEC811-1-1 and IEC811-1-2 respectively. The results were as follows.

| Example | 26 | 27 | 28 | Comp 29 |
|---|---|---|---|---|
| Wt % of Masterbatch | 10 | 15 | 20 | 5 |
| Wt % of silyl polymer | 90 | 85 | 80 | 95 |
| Heat Elongation | 185 | 114 | 71 | 65 |
| Tensile St (MPa) | 21.8 | 22.5 | 22.4 | 19.4 |
| Elongation % | 573 | 533 | 480 | 460 |
| Ageing % Retention | | | | |
| Tensile Strength | — | — | 90 | 99 |
| Elongation | — | — | 67 | 95 |

EXAMPLE 30-32

The process of Ex 28 is repeated with a master batch containing 20 parts of Doverphos 680 phosphite and differing amounts of IRGANOX 1010 and MD1024 and LDPE. The masterbatches are mixed in a 5:95 wt wt ratio with the silyl polymer of Ex 26. The masterbatches are as follows.

| Example | 30 | 31 | 32 |
|---|---|---|---|
| LDPE | 72.5 | 77.5 | 80 |
| IRGANOX 1010 | 5 | | |
| IRGANOX MD1024 | 2.5 | 2.5 | — |
| DOVERPHOS 680 | 20 | 20 | 20 |

The formulations are curable by immersion in water at 80° C. for 16 hr to give results comparable to those in Ex 28.

I claim:

1. A moisture-curable composition comprising (i) an organic polymer containing hydrolyzable silane groups and (ii) a moisture-curing catalyst thereafter, said catalyst being a mono-or poly-phosphite or phosphonite or a non-acidic ester of a sulphur oxy acid, wherein when the catalyst is a trialkyl phosphite, each of the alkyl groups contains from 13 to 22 carbon atoms.

2. A composition according to claim 1 wherein free of any organotin catalyst.

3. A composition according to claim 2 wherein free of any other silanol condensation catalyst.

4. A composition according to claim 2 wherein catalyst (ii) is a phosphite.

5. A composition according to claim 4 wherein the amount of phosphite is 0.1-5% by weight of the silyl polymer, 6. A composition according to claim 4 wherein the phosphite has at least 2 phosphite ester groups per molecule.

7. A composition according to claim 6 wherein the phosphite is derived from at least one polyol with 2-4 hydroxyl groups.

8. A composition according to claim 7 wherein the phosphite has more phosphorus O aromatic bonds than phosphorus O aliphatic bonds.

9. A composition according to claim 7 wherein said phosphite is also formed from an aliphatic mono alcohol.

10. A composition according to claim 7 wherein said organic polymer is an organic olefinic polymer.

11. A composition according to claim 1 which it also comprises at least one phenolic or amine antioxidant.

12. A composition according to claim 1 which it is a mixture of (a) a premixed masterbatch comprising an inert thermoplastic polymer and said curing catalyst (ii) in the absence of any other silanol condensation catalyst and (b) said silyl polymer (i).

13. A moisture-curable composition comprising (i) an organic polymer containing hydrolyzable silane groups and (ii) a moisture-curing catalyst therefor, said catalyst being a non-acidic polyphosphite with at least three phosphite groups per molecule and derived from at least one polyol with 2-4 hydroxyl groups or a non-acidic ester of a sulphur oxy group, said catalyst being present in an amount of 0.1-5% by weight of the silyl polymer.

14. A method of curing an organic polymer containing hydrolyzable silane groups (i) wherein the said polymer is cured in the presence of a moisture-curing catalyst (ii), which consists essentially of a non-acidic ester of a phosphorus or sulphur oxy acid.

15. A method of claim 14, wherein said organic polymer is an olefinic polymer.

16. A moisture-curable composition comprising (i) an organic polymer containing hydrolyzable silane groups and (ii) a moisture-curing catalyst therefor, said catalyst being a non-acidic ester of a phosphite having two rings containing phosphorus bonded to oxygen with 2 phosphorus atoms bonded to an $(-O)_2R^{16}(O-)_2$ group wherein $R^{16}$ is tetravalent or of a sulfur-oxy acid, said catalyst being present in an amount of 0.1-5% by weight of the silyl polymer.

* * * * *

UNITED STATES PATENT AND TRADEMARK OFFICE
CERTIFICATE OF CORRECTION

PATENT NO. : 5,420,208
DATED : May 30, 1995
INVENTOR(S) : WILLIAM B. REID

It is certified that error appears in the above-indentified patent and that said Letters Patent is hereby corrected as shown below:

Col. 2, line 63, after "thermoformed" change the comma (,) to a period (.)

Col. 4, line 23, after "comprising" insert --(i),(ii)--

Col. 5, line 64, correct formula II to read, $--[R^5O-P(OR^6)O]_nR^7--$

Col. 8, line 35, correct the spelling of --alk<u>y</u>lene---

Col. 8, line 43, correct the designation of --MD 1024---

Col. 9, line 52, delete the semi-colon after "15-20%"

Col. 12, line 54, correct the temperature designation to read --140°C--

Col. 12, line 57, start a new paragraph with the words "The phosphites"

Claim 2, line 1, strike "wherein"

UNITED STATES PATENT AND TRADEMARK OFFICE
CERTIFICATE OF CORRECTION

PATENT NO. : 5,420,208
DATED : May 30, 1995
INVENTOR(S) : William B. Reid

It is certified that error appears in the above-indentified patent and that said Letters Patent is hereby corrected as shown below:

Column 15, Claim 3, line 1, strike "wherein"

Signed and Sealed this

Twelfth Day of December, 1995

Attest:

BRUCE LEHMAN

Attesting Officer

Commissioner of Patents and Trademarks